United States Patent [19]

Sakai et al.

[11] 4,420,718
[45] Dec. 13, 1983

[54] CONTROL SYSTEM FOR INDUCTION MOTOR USING INVERTER FOR AC POWER SUPPLY

[75] Inventors: Keijiro Sakai; Yasuo Matsuda, both of Hitachi; Mitsuyuki Honbu, Katsuta, all of Japan

[73] Assignee: Hitachi, Ltd., Tokyo, Japan

[21] Appl. No.: 326,809

[22] Filed: Dec. 2, 1981

[30] Foreign Application Priority Data

Dec. 5, 1980 [JP] Japan ................................ 55-170953
Jul. 1, 1981 [JP] Japan ................................ 56-101176

[51] Int. Cl.³ ............................................. H02P 5/40
[52] U.S. Cl. .................................................. 318/729
[58] Field of Search ........................................ 318/729

[56] References Cited

U.S. PATENT DOCUMENTS 4,249,120  2/1981  Earle ..................... 318/729
4,291,264  9/1981  Siemon ................... 318/729

Primary Examiner—David Smith, Jr.
Attorney, Agent, or Firm—Antonelli, Terry & Wands

[57] ABSTRACT

An control system for an induction motor driven by an AC output of variable frequency and voltage produced from an inverter which converts DC power obtained by a converter through conversion of AC power having constant voltage and constant frequency. The system comprises means for estimating the power factor of the induction motor from an input current to the inverter, means for controlling the voltage of the AC output from the inverter when the estimated power factor is outside a predetermined range, and means for restricting the control of the AC output voltage to prevent the ratio between the AC output voltage and the AC output frequency from exceeding a predetermined range.

8 Claims, 10 Drawing Figures

CONTROL SYSTEM FOR INDUCTION MOTOR USING INVERTER FOR AC POWER SUPPLY

This invention relates to a control system for an induction motor using an inverter for AC power supply and more particularly to a control system which can improve the efficiency of this type of induction motor under light-load conditions.

An induction motor drive system wherein a three-phase AC power of constant voltage and constant frequency is converted into a DC power by a converter, and the DC power is converted by an inverter into a three-phase AC power of variable frequency and voltage, which is supplied to the induction motor for driving the same is widely used when a wide range of speed control is required for induction motors. Conventionally, in this type of drive system, when changing the speed of the induction motor by changing frequency f of the AC output of the inverter, the so-called constant V/f ratio control in which the voltage V of the output is also changed for making V/f constant is usually employed in order to maintain the output torque of the induction motor constant. However, since the constant V/f ratio control functions to make the V/f ratio constant irrespective of the magnitude of loads, the exciting current flowing through the induction motor under light-load conditions becomes large relative to effective power corresponding to the load with the result that its power factor is decreased and its power loss is increased accordingly, thus leading to decrease in its efficiency.

An approach to decreasing the power loss under light-load conditions in induction motors driven with an AC power at a given frequency is disclosed in, for example, "NASA Motor-Control Circuit Cuts Electric Cost" by Mylesh Marks, Popular Electronics, October 1979, according to which the power factor of AC power supplied to the induction motor is detected and in compliance with a deviation of power factor from a predetermined reference value, the input voltage to the AC motor is decreased to make the power factor coincident with the predetermined reference value, thus decreasing the power loss. The decrease in the input voltage to the motor should affect the torque and revolution of the motor but no countermeasure therefor is suggested in the above proposal. Another proposal has therefore been made in which as the power factor decreases, the motor input voltage is decreased to improve the power factor and additionally the revolutions of the motor are controlled automatically. In any case, it requires a power factor detecting circuit, and the provision of an automatic revolution control circuit will result in a more complicated circuit. Further, one may refer to Japanese patent application No. 2585/77 entitled "Control System for AC Motor" and laid-open as Laid-open No. 88115/78, according to which an input power supplied to an AC motor is detected and at least one of the voltage and frequency of a power supply source is controlled so as to minimize the input power. This control based on the input power to the AC motor requires not only a device for measuring the input power but also a circuit for deciding whether or not the input power, which may vary depending on its load, is minimal.

When an AC input voltage and current supplied to an induction motor is denoted by V and I, respectively, and a power factor by $\cos\phi$, the input power to the motor is given by $VI\cos\phi$ which is the sum of a motor load and a motor loss. It is generally known that when an AC motor is driven at a constant load within its rating capacity, the motor loss decreases and power factor increases as the input voltage V decreases. Especially, for motors loaded with light loads, the input voltage can be adjusted over a wide range without failure to maintain the motor output corresponding to its load, so that it can be reasonably expected that the motor loss can advantageously be decreased by decreasing the input voltage.

In connection with an induction motor drive system wherein a constant voltage and constant frequency AC power is converted into a DC power by a converter and an induction motor is driven by an AC power of variable voltage and frequency obtained by conversion of the DC power by an inverter, the inventors of this invention have found that the power factor of the motor in operation can be estimated from an input current to the inverter. The motor drive system is typically incorporated with an input current detector for monitoring over-loading of the motor and the detection of this detector will therefore be utilized for estimation of the motor power factor, thus making it possible to use the power factor as a controlling factor without additional provision of an independent power factor detecting circuit.

It has been also found that when it is desired to control the voltage of an AC input to the motor while maintaining its frequency constant for the purpose of decreasing the motor loss, the affect of the voltage control upon torque can be limited to an allowable range by monitoring the change in V/f resulting from the change in V and preventing deviation of the V/f from a predetermined range.

The present invention is based on the above findings and has for its object to provide a control system for an induction motor using an inverter which can decrease the motor loss under light-load conditions and which is simple in construction without either a power factor detecting circuit or a power detecting circuit.

According to the invention, the above object can be accomplished by a control system for an induction motor driven by an AC output of variable frequency and voltage produced from an inverter which converts DC power resulting from conversion by a converter of constant voltage and constant frequency AC power, the system comprising means for estimating a power factor of the induction motor from an input current to the inverter, means for controlling a voltage of the AC output from the inverter when the estimated power factor is outside a predetermined range, and means for restricting the control of the AC output voltage to prevent the ratio between the AC output voltage and the AC output frequency from exceeding a predetermined range.

The present invention will be apparent from the following detailed description taken in conjunction with the accompanying drawings, in which.

Figure 1:
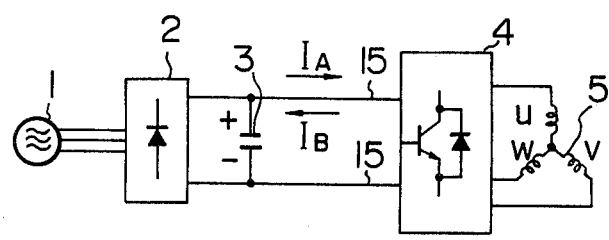
FIG. 1 is a block diagram of a power supply circuit for an induction motor to which the invention is applied.

A drive circuit for an induction motor to which the invention is applied has a construction as shown in FIG. 1. In the Figure, a constant voltage and frequency three-phase AC power source 1 is connected to a converter 2 for conversion of AC to DC. The converter 2 is connected via DC buses 15 to a transistor inverter 4. Connected across the DC buses 15 is a smoothing capacitor 3. The inverter 4 is connected to an induction motor winding 5 of three phases U, V and W.

Figure 2:
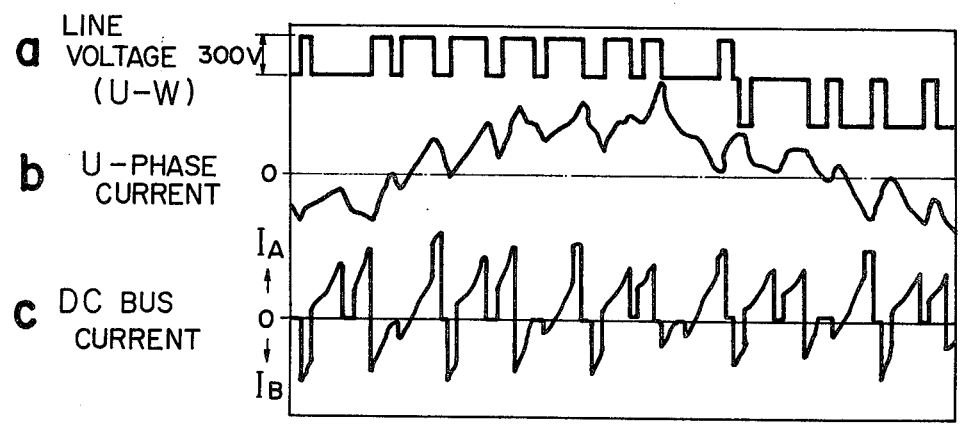
FIG. 2 illustrates waveforms in the circuit of FIG. 1.

DC current flowing through the DC buses 15 has a flow-in or positive polarity component $I_A$ to the inverter 4 and a flow-out or negative polarity component $I_B$ therefrom as shown at section C in FIG. 2. Line voltage across the U and W phases of the induction motor winding 5 has a waveform as shown at FIG. 2a and the current flowing through the U phase has a waveform as shown in FIG. 2b.

Through experiments conducted by the inventors, when an induction motor of six poles, 2.2 kW and a rated V/f ratio of 200 V/60 Hz was operated with the drive circuit as shown in FIG. 1 under two conditions, one being such that the output voltage of the inverter was held constant, the output frequency of the inverter was fixed at 55 Hz and the load was varied and the other being such that the output voltage of the inverter was held constant and the output frequency was varied under no load, the relation between the power factor $\cos \phi$ and function δ as defined by the following equation (1) were examined. The results are shown graphically FIGS. 3 and 4.

$$\delta = \frac{I_A - I_B}{I_A + I_B} \quad (1)$$

Figure 3:
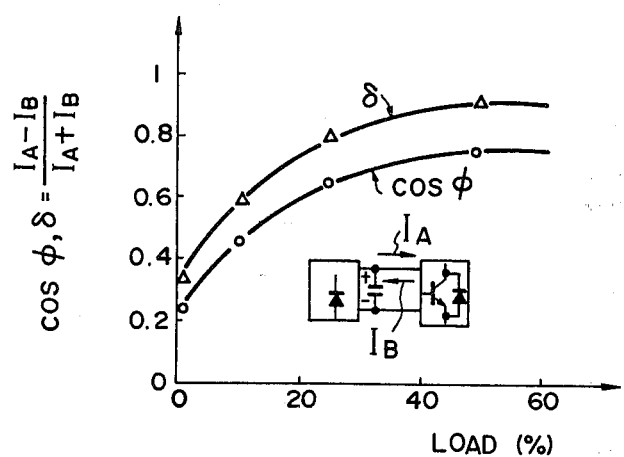
FIG. 3 is a graph showing the relation between load and power factor and a function $\delta$.
Figure 4:
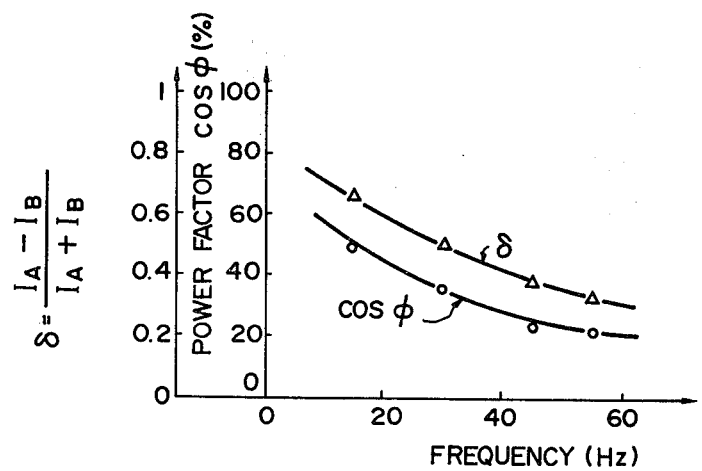
FIG. 4 is a graph showing the relation between frequency of the motor input voltage and the function $\delta$.

As will be seen from FIG. 3, the power factor increases when increasing its motor load and the function δ increases correspondingly with the power factor. Also, FIG. 4 shows that the power factor decreases when increasing the frequency and the function δ decreases correspondingly with the power factor. Accordingly, the estimation of the power factor can be done by detection of the current flowing through the DC buses 15 i.e., DC current into the inverter, and applying it to the equation (1) without providing any conventional power factor detecting device.

Incidentally, when the output frequency f of the inverter is changed in order to control the revolutions of an induction motor in compliance with its load condition, the so-called constant V/f ratio control is typically adopted in which the V/f ratio is held constant by changing the output voltage V for the purpose of maintaining the output torque of the motor constant. In this case, the V/f ratio is preferably set to a value $V_o/f_o = k_M$ corresponding to a rated voltage $V_o$ and a rated frequency $f_o$ of the motor. Generally, if the output voltage V exceeds $k_M \cdot f$ for the output frequency of the inverter being f, an exciting current of the motor increases, resulting in an increased power loss. Accordingly, the output voltage V is required to be $V \leq V_M$, where $V_M = K_M \cdot f$, for decreasing the power loss. Although the design of the induction motor is such that a maximum efficiency can be attained when the induction motor is operated at full load with an AC input of its rated voltage $V_o$ and frequency $f_o$, the maximum efficiency is attained with an input voltage V ($V < V_M$) which is lower than the rated voltage $V_o$ when the load is decreased and the value of V changes with the motor design and the magnitude of load. However, an excessive decrease of the input voltage V results in failure to maintain the torque required for the load and should be inhibited. In accordance with the invention aiming at reduction of motor loss under light-load conditions, a constant $k_L$ is determined depending on the degree of an intended light load and a lower limit $V_L$ of the input voltage is set to $V_L = k_L \cdot f$ for the input frequency of f.

Figure 5:
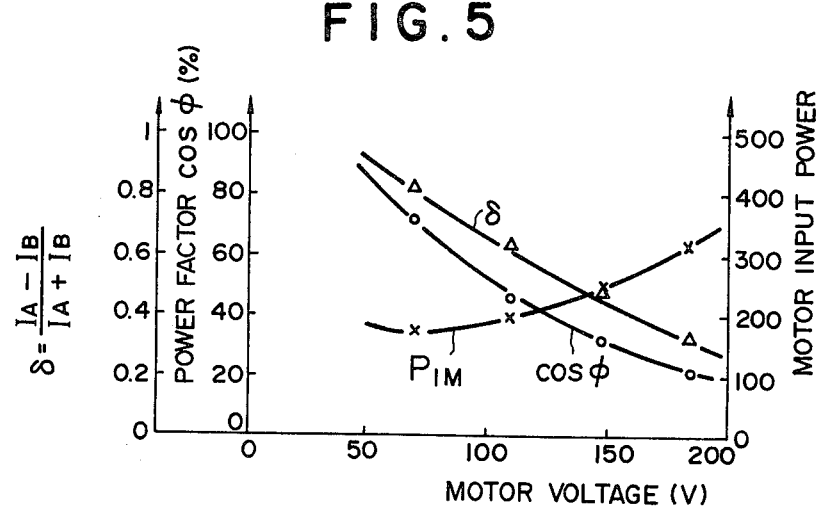
FIG. 5 is a graph showing the relation between the motor input voltage and motor input power, power factor and function δ.

With respect to the relation between power factor and efficiency, it is known that a higher power factor does not always give a higher efficiency, and the power factor value for the maximum efficiency depends on capacity and load of the motor. Accordingly, a range of power factor is determined so that a satisfactory efficiency can be obtained when the power factor is held within the range at the intended light load condition according to the characteristics of the motor, and the upper and lower limits $\delta_1$ and $\delta_2$ of the power factor estimating function δ are determined correspondingly to the power factor range as determined. Where the load and the output frequency are fixed, the relation between the input voltage to the motor, i.e. the output voltage V of the inverter and the function δ is such that δ decreases with increasing of the output voltage V and δ increases with decreasing of the output voltage V. Thus, in the present invention, the power factor estimating function δ is obtained by positive polarity and negative polarity components $I_A$ and $I_B$ of the input current of the inverter as described hereinbefore, and the control is carried out such that when $\delta > \delta_1$, the inverter output voltage V is increased but not allowed to exceed the upper limit $V_M$ and when $\delta < \delta_2$, V is decreased but not allowed to be less than the lower limit $V_L$. When an induction motor of 2.2 kW is operated under no load with its input frequency f fixed to 55 Hz, the relations between the input voltage V and the function δ, power factor $\cos \phi$ and input power $P_{1M}$ are obtained as graphically depicted in FIG. 5. As seen from the figure, when the input voltage V decreases, the power factor $\cos \phi$ increases, while the input power, i.e. the power loss $P_{1M}$ decreases, but reaches its minimum point at about 70 volts of the input voltage V where the motor is at the highest efficiency. In this case, it is preferred to select the factors as $\delta_1 = 0.78$, $\delta_2 = 0.70$ $V_L = \frac{1}{2}$ of the rating voltage in application of the present invention.

Figure 6:
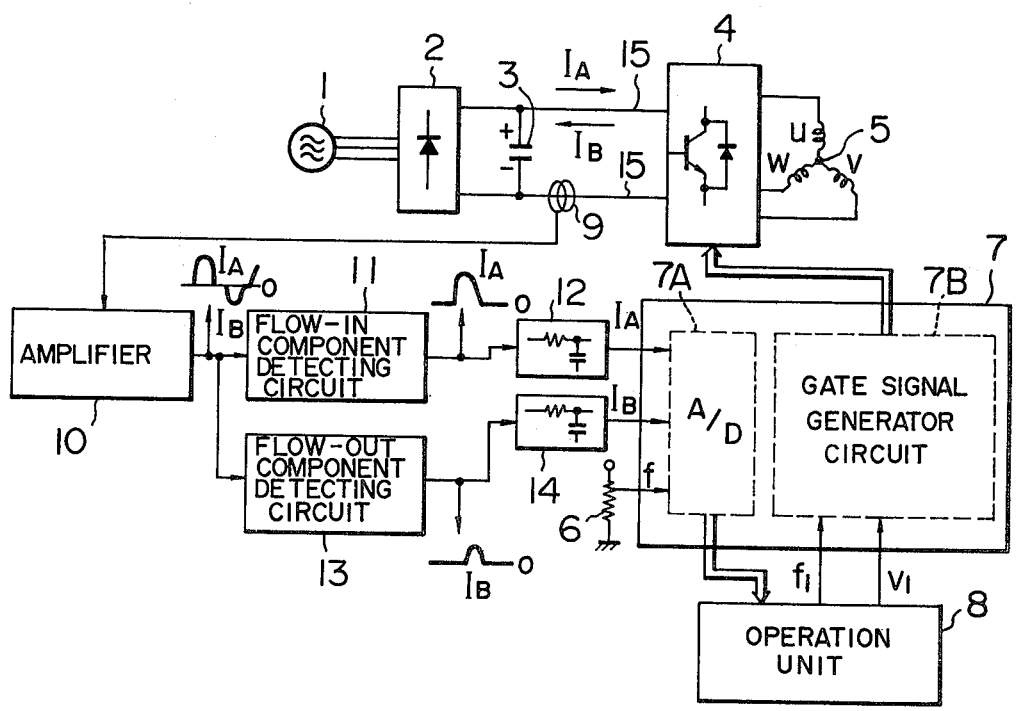
FIG. 6 is a block diagram of a control circuit according to the invention.

A circuit arrangement of the control system of the invention will now be described with reference to FIG. 6 in which the same elements as those of FIG. 1 are designated by the same reference numerals. A DC current transformer 9 insulated from a DC bus 15 is inserted therein for detection of input current to an inverter. The output of the DC current transformer 9 is connected to an amplifier 10. The output of the amplifier 10 is branched into two ways, one of which is connected to an A/D converter 7A of an inverter control circuit 7 via a flow-in component detecting circuit 11 adapted to detect a flow-in or positive polarity component $I_A$ of DC current and a filter 12 and the other is connected to the A/D converter 7A via a flow-out component detecting circuit 13 adapted to detect a flow-out or negative polarity component $I_B$ of the DC current and a filter 14. Applied to the A/D converter 7A is an output signal f of a frequency command potentiometer which sets a frequency corresponding to a target of revolutions of the induction motor. Signals $I_A$, $I_B$ and f are converted by the A/D converter 7A into digital signals and applied to an operation unit 8. The operation unit 8 constituted by a microcomputer, for example, prepares, as will be seen from a flow chart of FIG. 7, command signals for inverter output voltage V and frequency f and applies them to a gate signal generator circuit 7B of the inverter control circuit 7. In response to these command signals, the gate signal generator circuit 7B generates a gate signal which is applied to transistors or thyristors constituting the inverter 4. The inverter 4 then generates an AC output whose voltage and frequency are corresponding to the command signals.

Figure 7:
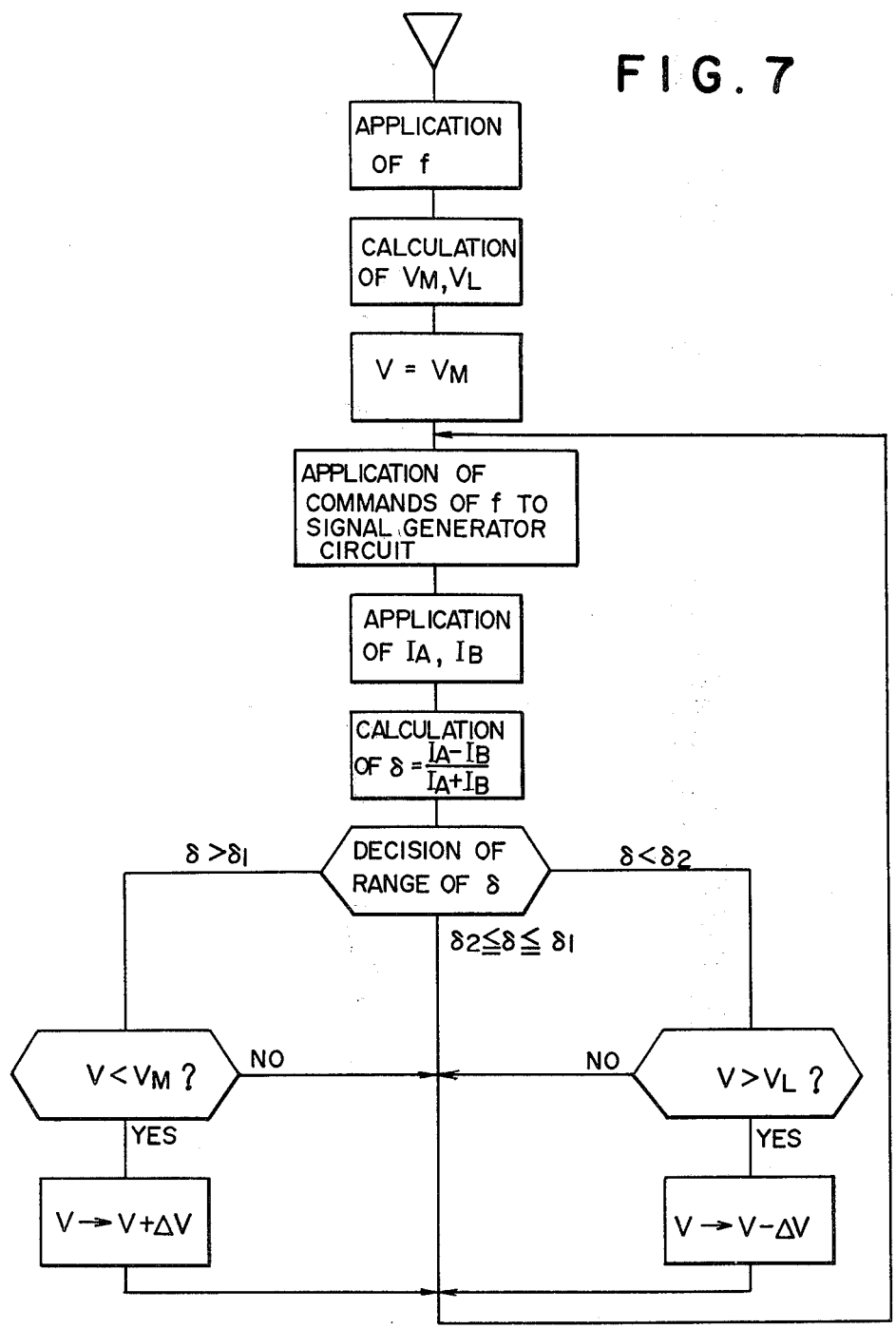
FIG. 7 is a flow chart for explaining the operation of a microcomputer in the control circuit of FIG. 6.

The operation of the microcomputer will now be described with reference to the flow chart of FIG. 7. The microcomputer receives a digital signal f corresponding to a desired frequency of the motor from the A/D converter circuit, computes $V_M = k_M \cdot f$ and $V_L = k_L \cdot f$, and stores the computed values of $V_M$ and $V_L$. The first setting of the command signal of the inverter output voltage V is such that $V = V_M$. This determines command signals of the inverter output voltage V and frequency f when starting operation and these command signals are applied to the gate signal generator circuit 7B. The inverter 4 is responsive to these command signals to generate an AC output of voltage $V_M$ and frequency f which in turn drives the induction motor 5. Then, a current flows dependent on a load of the motor through the inverter and its positive polarity component $I_A$ and negative polarity component $I_B$ are detected. The detected values are converted by the A/D converter 7A into digital signals and then read by the microcomputer, which calculates a power factor estimating function $\delta$ based on the $I_A$ and $I_B$. The calculated $\delta$ is compared with its upper and lower limits $\delta_1$ and $\delta_2$ and it is decided which range the $\delta$ belongs to, $\delta < \delta_1$, $\delta_2 \leq \delta \leq \delta_1$ or $\delta < \delta_2$. The processing proceeds with one of the following routines depending on the decided range when $$\delta_2 \leq \delta \leq \delta_1: \tag{1}$$

The command signals of f and V are not changed and the previous values thereof are held.

when $$\delta < \delta_2: \tag{2}$$

The inverter output voltage V is decided as to whether or not $V > V_L$ stands. If $V > V_L$ indicating that the V is to be decreased, the command signal of V is updated to $V - \Delta V$. As a result, the inverter output voltage is decreased by $\Delta V$ so that the power factor is increased and the $\delta$ is also increased toward the range of $\delta_2 \leq \delta \leq \delta_1$. When $V - \Delta V$ is less than $V_L$, V is updated to $V_L$ instead of $V - \Delta V$ so as to prevent V from falling below $V_L$. Consequently, when $V > V_L$ does not stand, $V = V_L$ is expected and V is held at the value of $V_L$ even when $\delta < \delta_2$.

when $$\delta > \delta_1: \tag{3}$$

It is decided whether or not the inverter output voltage V is $V < V_M$. If $V < V_M$, V is increased by $\Delta V$ so that the command signal of V is updated to $V + \Delta V$. Consequently, the inverter output voltage is increased by $\Delta V$, the power factor is decreased and $\delta$ is decreased toward the range of $\delta_2 \leq \delta \leq \delta_1$. The value of $V + \Delta V$ is inhibited from exceeding the upper limit $V_M$. Accordingly, unless $V < M_M$, it is certain that $V = V_M$ stands and in this case, $V = V_M$ is held.

Figure 8:
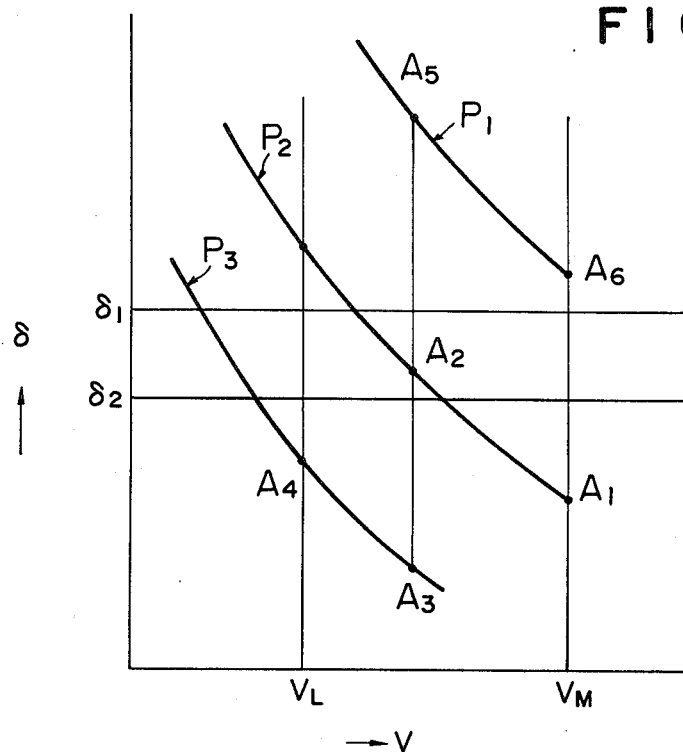
FIG. 8 is a graph showing the relation between the motor input voltage and function δ during the operation of the control circuit according to the invention.

In this manner, when $\delta$ is outside the range of $\delta_2 \leq \delta \leq \delta_1$, the inverter output voltage V is increased or decreased and hence $\delta$ is caused to change toward that range. As far as V is less than $V_M$ and larger than $V_L$, the process for increasing or decreasing V continues until $\delta$ comes within the range. But, when V takes $V_M$ or $V_L$ before $\delta$ comes within the range, further increase or decrease of V is inhibited and V is held at $V_M$ or $V_L$, respectively. FIG. 8 illustrates the process in change of V and $\delta$ as mentioned above, where the abscissa represents the inverter output voltage or the motor input voltage V and the ordinate represents the power factor estimation function $\delta$. As described above, where the motor load is fixed, the increase of the motor input voltage V is followed by the decrease of $\delta$. With the input voltage V fixed, the decrease of load is followed by the decrease of $\delta$. FIG. 8 illustrates the relation between V and $\delta$ in the cases of motor loads $P_1$, $P_2$ and $P_3$ ($P_1 > P_2 > P_3$) as parameters. The motor voltage V is $V_M$ at the time of starting. If the load is $P_2$, the motor is driven at point $A_1$ where $\delta$ is below $\delta_2$. Accordingly, V is decreased stepwise by $\Delta V$ so that $\delta$ is increased to reach point $A_2$ within the range between $\delta_1$ and $\delta_2$, thus stopping the decrease of V. Under this condition, if the load increases to $P_1$, $\delta$ is also increased so that the motor driving condition is shifted to point $A_5$ where $\delta > \delta_1$ stands. Then, the control operates to increase stepwise by $\Delta V$, causing $\delta$ to decrease gradually. But, V is not allowed to exceed the upper limit $V_M$ and hence the ultimate state at point $A_6$ is held. If the motor load is decreased from $P_2$ to $P_3$, $\delta$ is then decreased and the motor driving condition is shifted from point $A_2$ to point $A_3$ where $\delta < \delta_2$ stands. Then V is decreased stepwise by $\Delta V$, causing $\delta$ to increase gradually. But, V is not allowed to decrease below $V_L$ and the ultimate state at point $A_4$ is held.

Figure 9:
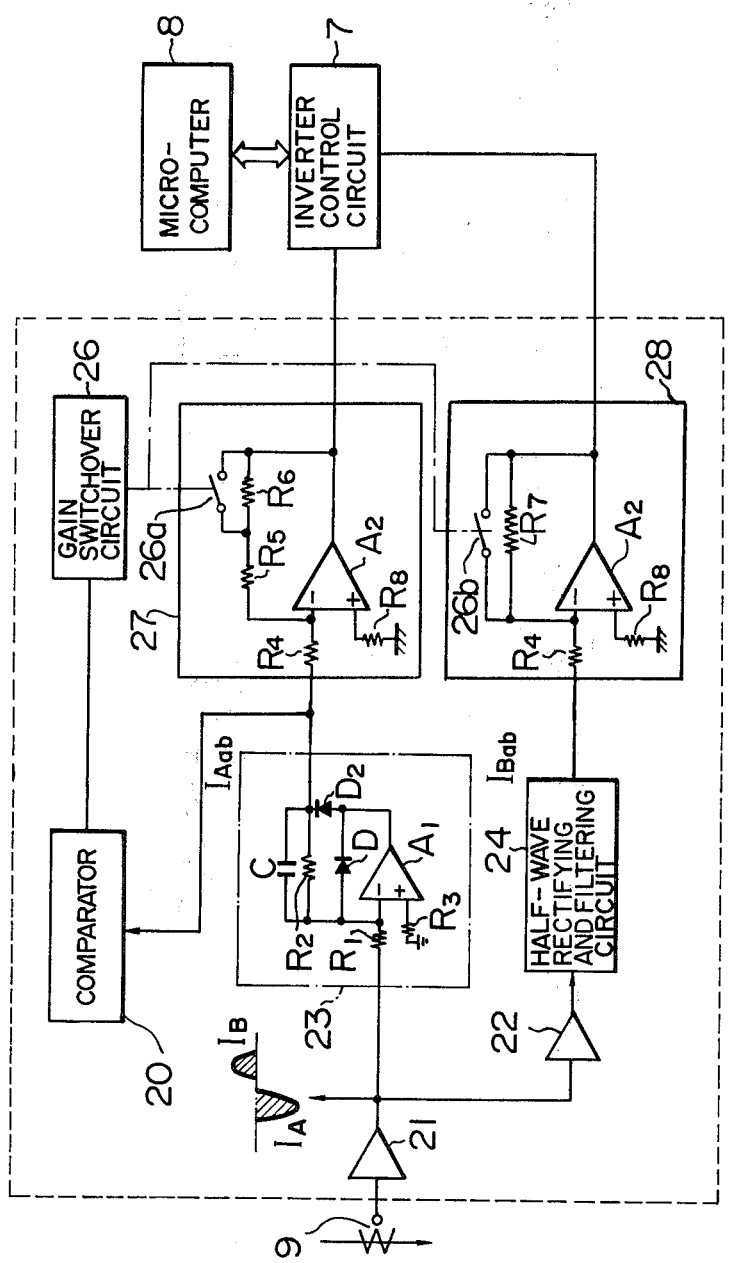
FIG. 9 is a fragmentary block diagram showing another embodiment of the invention.

In the foregoing embodiment, the range of values of the function $\delta$ is decided independently of the magnitude of the load and the inverter output voltage V is controlled on the basis of the results of the decision. However, as shown in FIG. 8, for larger loads, the controllable range of V is restricted by the upper limit $V_M$, so that the control of V is less contributable to the decrease of loss intended by the present invention. However, for larger loads, the induction motor inherently gives high efficiency and hence the control of the power factor estimation function $\delta$ is of no significance. Accordingly, the control of the function $\delta$ may be applied to only a light load condition for achieving the object of the invention. In this case, the range of load which makes effective the control depends on characteristics of the motor and possible load conditions. Generally, it is enough to make the control effective for the motor loads of less than 30 to 40% of the motor capacity. In the equation (1) for determination of the power factor estimation function δ, when the inverter input current becomes relatively large, the flow-out or negative polarity component $I_B$ becomes relatively small as compared with the flow-in or positive polarity component $I_A$ and the flow-in component $I_A$ will therefore be representative of the inverter input current. Accordingly, while both the components $I_A$ and $I_B$ are used for calculation of the function δ under light-load conditions in which the power factor control is to be effected, only the flow-in component $I_A$ is used under larger load conditions to detect the inverter or motor current which may be used for protection of the inverter or motor from overcurrent. FIG. 9 shows a circuit arrangement adapted for the utilization of the flow-in component $I_A$ and the flow-out component $I_B$ in such a manner as mentioned above. Specifically, this circuit arrangement substitutes for the circuits connected between the output of the DC current transformer 9 and the input of the inverter control circuit 7 in FIG. 6.

As shown in FIG. 9, this circuit arrangement comprises an inverting amplifier 21 connected to a DC current transformer 9, an inverting circuit 22, a first half-wave rectifying and filtering circuit 23, a second half wave rectifying and filtering circuit 24, a comparator 20, a gain switchover circuit 26, a flow-in component amplifier 27, and a flow-out component amplifier 28.

The first and second half-wave rectifying and filtering circuits 23 and 24 have the same construction, having each an amplifier. An amplifier $A_1$ of the first half-wave rectifying and filtering circuit 23 has a negative input terminal connected to the output of the inverting amplifier 21 via a resistor $R_1$ and to the output of the amplifier $A_1$ via a parallel circuit including a capacitor C, a resistor $R_2$ and a diode $D_1$. Connected between one end of the resistor $R_2$ and the cathode of the diode $D_1$ is a diode $D_2$ which is cooperative with the diode $D_1$ to complete rectifying effect. The amplifier $A_1$ has a positive input terminal grounded via a resistor $R_3$.

The flow-in component amplifier 27 and the flow-out component amplifier 28 are of the same construction as having each an amplifier having a negative input terminal connected to the half-wave rectifying and filtering circuit. Specifically, an amplifier unit $A_2$ of the flow-in component amplifier 27 has its negative input terminal connected through a resistor $R_4$ to the first half-wave rectifying and filtering circuit 23 and a positive input terminal grounded via a resistor $R_8$. The negative input terminal is also connected to the output of the amplifier unit $A_2$ via resistors $R_5$ and $R_6$. Connected across the resistor $R_6$ is a normally open switch 26a. The flow-out component amplifier 28, on the other hand, has an amplifier unit A, having its negative input terminal connected to the output of the amplifier unit $A_2$ via a resistor $R_7$ ($=R_5+R_6$), across which a normally open switch 26b is connected.

The outputs of the flow-in component amplifier 27 and flow-out component amplifier 28 are connected to input terminals of an inverter control circuit 7. The output of the first half-wave rectifying and filtering circuit 23 is connected to the gain switchover circuit 26 via the comparator 20. This gain switchover circuit 26 is operatively connected to the flow-in component amplifier 27 and the flow-out component amplifier 28.

In operation, a signal from the DC current transformer 9 is inverted and amplified at the inverting amplifier 21. At the first half-wave rectifying and filtering circuit 23, a flow-in or previously positive polarity component $I_A$ contained in an output signal of the inverting amplifier 21 is selected by half-wave rectification, then smoothed by the capacitor C and amplified at a constant gain determined by the resistors $R_1$ and $R_2$ so as to be delivered out as a flow-in component average value $I_{Aab}$. Concurrently therewith, at the second half-wave rectifying and filtering circuit 24, a flow-out or previously negative polarity component $I_B$ contained in the output signal of the inverting amplifier 21 is selected by half-wave rectification, smoothed and amplified at a fixed gain to be delivered out as a flow-out component average value $I_{Bab}$.

Figure 10:
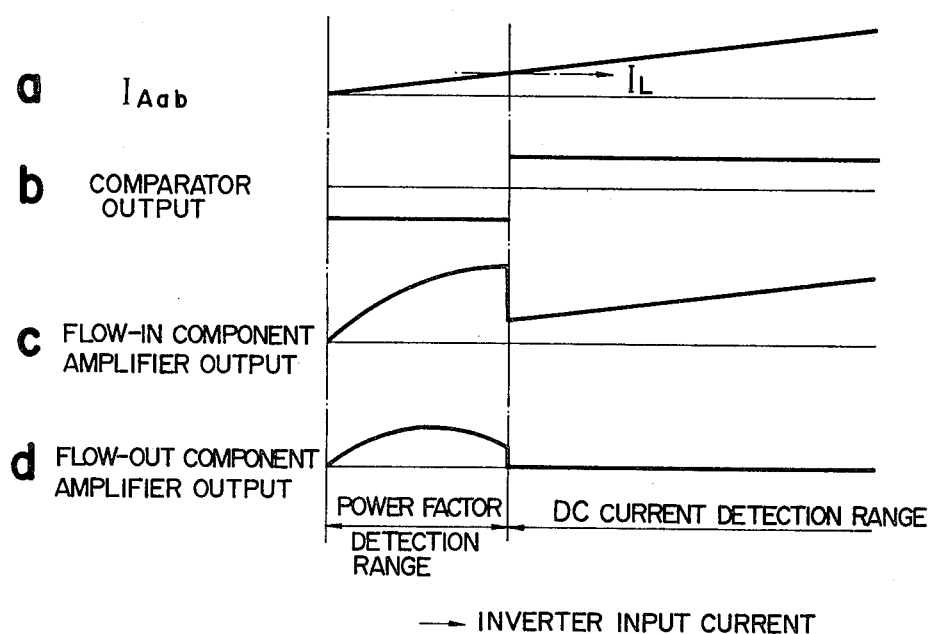
FIG. 10 illustrates waveforms in the circuit of FIG. 9.

The flow-in component average value $I_{Aab}$ is then coupled to the comparator 20 and compared with a predetermined level $I_L$. Then, as shown at a and b in FIG. 10, the comparator 20 feeds to the gain switchover circuit 26 a low level signal when the flow-in component average value $I_{Aab}$ is below the predetermined level $I_L$ and a high level signal when the $I_{Aab}$ exceeds the level $I_L$. Upon receipt of the high level signal, the gain switchover circuit 26 produces an output signal which closes the switches 26a and 26b included in the amplifiers 27 and 28 thereby to reduce the gain of the flow-in component amplifier 27 by about ½ to ¼ and to reduce the gain of the flow-out component amplifier 28 to zero. As a result, the flow-in component amplifier 27 produces an output signal as shown in FIG. 10c. The reason why the gain of the flow-in amplifier 27 is reduced as described above is that the output of the flow-in component amplifier 27 is desired to be prevented from saturation even when the inverter is accidentally subjected to a short-circuit. The output of the flow-out component amplifier 28 falls to zero as shown in FIG. 10d when the flow-in component exceeds $I_U$. Consequently, only the output of the flow-in component amplifier 27 is supplied to a microcomputer 8 via the inverter control circuit 7 to be used for detection of the DC input current.

In the absence of the output signal from the comparator 20, on the other hand, the switches 26a and 26b stand open and the gains of the flow-in component amplifier 27 and the flow-out component amplifier 28 are maintained high, so that the amplifiers produce output signals having waveforms as shown in the range of power factor detection at c and d in FIG. 10 are supplied to the microcomputer via the inverter control circuit 7 and the function δ is calculated in the same manner as described hereinbefore for execution of the power factor control.

While, in the foregoing embodiments, the DC current is detected by a current transformer, the invention may use any other type of detector whose output follows a waveform of the current flowing through the DC bus. Further, it will readily be understood from equation (1) that in place of the function δ corresponding to the power factor, another function of the flow-in or positive polarity and flow-out or negative polarity components $I_A$ and $I_B$, for example, $I_A/I_B$ may be used as a power factor estimation function.

What is claimed is:

1. A control system for an induction motor driven by an AC output of variable frequency and voltage produced from an inverter which converts DC power obtained by a converter through conversion of AC power having constant voltage and constant frequency, said system comprising:

means for determining the value of a power factor estimation function δ defined as function of a positive polarity component and and of a negative polarity component of an input current of said inverter;

means for progressively increasing the output voltage of said inverter when the value of the function δ is larger than $δ_1$ and decreasing the output voltage of said inverter when the value of the function δ is less than $δ_2$, where $δ_1$ and $δ_2$ are predetermined values of the function δ and $δ_1 > δ_2$, and means for inhibiting the output voltage of said inverter from increasing beyond a predetermined upper limit and decreasing below a predetermined lower limit.

2. A control system according to claim 1, wherein said power factor estimation function δ is $$\frac{I_A - I_B}{I_A + I_B},$$

where $I_A$ if the "flow-in" positive polarity component and $I_B$ is the neggative polarity component of the input current of said inverter.

3. A control system according to claim 1 or 2, further comprising means for enabling said function determining means to determine the function δ only when the positive polarity component $I_A$ is below a predetermined value.

4. A power factor detector for an induction motor driven by an AC output of variable frequency and voltage produced from an inverter which converts DC power obtained by a converter through conversion of AC power having constant voltage and constant frequency, said detector comprising:

means for detecting a positive polarity component $I_A$ and negative polarity component $I_B$ of an input current of the inverter; and means for computing a function δ relating to a power factor of the induction motor as a function of the positive polarity and negative polarity components $I_A$ and $I_B$, wherein said function δ is $$\frac{I_A - I_B}{I_A + I_B}.$$

5. A power factor detector according to claim 4, further comprising means for invalidating the negative polarity component $I_B$ when the positive polarity component $I_A$ exceeds a predetermined value.

6. A power factor detector for an induction motor driven by an AC output of an inverter, said inverter including means for converting DC power obtained by a converter through a conversion of AC power having constant voltage and constant frequency to an AC output of variable frequency and voltage for driving the induction motor, said detector comprising first detector means for detecting a positive polarity component $I_A$ of an input current of said inverter, second detector means for detecting a negative polarity component $I_B$ of the input current of the inverter, and means for computing a function δ relating to a power factor of the induction motor as a function of the positive polarity and negative polarity components $I_A$ and $I_B$ of the input current of the inverter.

7. A power factor detector according to claim 6, wherein the function δ is $$\frac{I_A - I_B}{I_A + I_B}.$$

8. A power factor detector according to claim 6 or 7, further comprising means for invalidating the negative polarity component $I_B$ when the positive polarity component $I_A$ exceeds a predetermined value.

* * * * *